J. H. BOYD.
Treating Ores of the Precious Metals.
No. 146,509.  Patented Jan. 20, 1874.
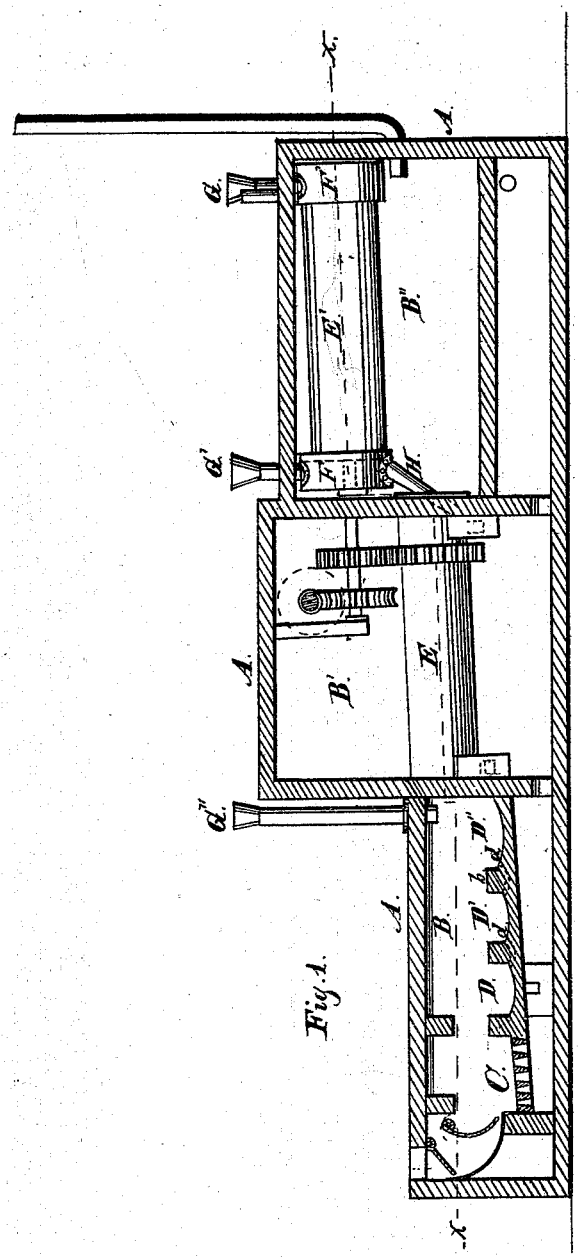
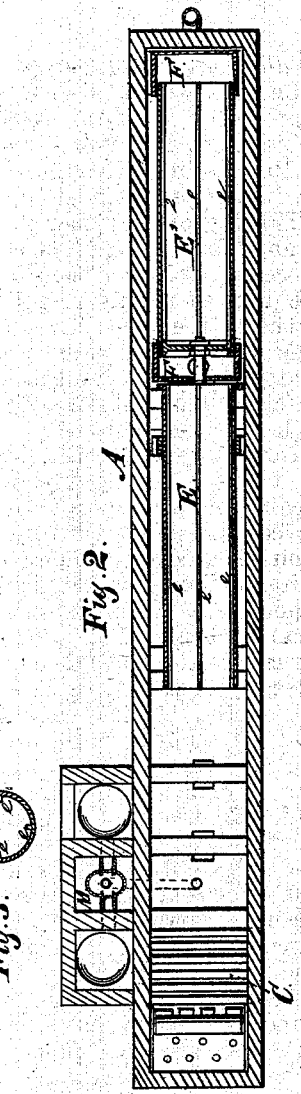

UNITED STATES PATENT OFFICE.

JAMES H. BOYD, OF CHICAGO, ILLINOIS.

IMPROVEMENT IN TREATING ORES OF THE PRECIOUS METALS.

Specification forming part of Letters Patent No. 146,509, dated January 20, 1874; application filed July 21, 1873.

*To all whom it may concern:*

Be it known that I, JAMES H. BOYD, of Chicago, in the county of Cook and State of Illinois, have invented certain Improvements in Process of Separating Ores, of which the following is a specification:

This invention, although it may be applied to any kind of ore, is especially adapted as a process of working those ores which contain the precious metals, as gold, silver, &c.

The nature of my invention is to treat the ores in one continuous process, and in the course of the same, and at different points and times, to treat it chemically and mechanically, as hereinafter explained.

In my improved process, I reduce the ores to a fine state by any of the well-known means; in this state it is more easily conveyed and delivered with regularity, desulphurizes quicker, is more easily mixed with suitable fluxes, and quicker reduced to the liquid state. The pulverized ore is fed into a chamber heated from without, and into which air is admitted to convey off the sulphurous gases and oxidize the base metals associated in the ores. In this condition the desulphurized ore, while still hot from the desulphurizing-chamber, is delivered into a second chamber in immediate connection therewith, in which the ore comes directly in contact with the flame, and while it is passing continuously, and still hot from the desulphurizing-chamber, I feed, continuously, suitable fluxes. In this second chamber the ore and fluxes are agitated and mixed, in contact with the flame, and delivered, at or near the fusion-point, into a reducing-chamber, in which the ore and fluxes are reduced to the liquid state, and, as the ores are continuously arriving in this chamber, the lightest and unreduced ore will float on the surface and be in contact with the reducing-flame, and, as fast as reduced to the liquid state, will separate in their order of gravitation, leaving the light or most liquid portion on top to be continually acting on the fresh arrivals from the previous chambers. The precipitated metals and heavier portions of the slag being precipitated in their order of gravitation, I cause them to pass continuously from the bottom into a second apartment of the reducing-chamber. The slag, being the lightest, floats to the surface and is floated off, leaving the precipitated metals at the bottom. From this apartment I cause the metals to pass into a third apartment of the reducing-chamber; the slag being previously separated, I have the separated metals in their order of gravitation. In this chamber I retain lead, in the liquid state, to take up and amalgamate with the gold and silver, and separate them from the other base metals associated therewith, leaving them on the surface to be raked or floated off to be again used as a flux for ores deficient in the base metals, or treated for the metals they contain. From this last apartment I withdraw, through the bottom, by means of a pipe or outlet, the lead containing the gold and silver. This pipe or outlet is connected with suitable vessel, so arranged as to retain any depth of lead necessary in the apartment for the separation of the gold and silver from the metals, and at the same time govern the flow from the different apartments, and leave free exit for the lead from the chamber. The enriched lead can be cupelled to separate the gold and silver, or separated in any suitable manner.

In working the ores by one continuous process, I use the heat from the fire-hearth to reduce the ore and keep it liquid during the separation, after which I use it in contact with the ore and fluxes, and afterward to sulphurize the ores.

I will now proceed to describe an apparatus suitable for carrying out my improved process, by reference to the accompanying drawing, which forms a part of this specification, and in which—

Figure 1 is a vertical longitudinal section of the several chambers. Fig. 2 is a horizontal section on the line *x x* of Fig. 1; and Fig. 3 is a transverse section of the cylinders.

In the said drawing, A represents the walls of a furnace which is divided into three general compartments, B B' B'', of which the compartment B contains the fire-grate C and the reducing hearths or apartments D D' D''. The compartment B', adjacent thereto, contains the hollow revolving cylinder E, inclined and open at both ends, so that the flame from the fire will enter and traverse it. The compartment B'', farthest from the fire, contains the inclined hollow revolving cylinder E', closed at both ends so that the fire does not enter it. At each end of the cylinder E' is a stationary band or cap, F F', within which the cylinder turns. Into these stationary caps the funnels or feed-pipes G G' enter. The funnel G is for feeding in the pulverized ore; the funnel G' is for feeding such fluxes as need to be applied after the ore has passed the cylinder E'; and the funnel G'', which opens into the reducing-hearth D'', is for the purpose of feeding in such fluxes and reducing agents as need to be applied after the ore has passed out of the cylinder E. The cylinders E E' are both furnished with lifts or ribs $e$, (shown at Fig. 3,) for the purpose of agitating the ore and causing it to tumble about in its passage through. The flame from the furnace passes over the reducing-hearths, through the interior of the cylinder E, and around the exterior of the cylinder E'. The ore passes in the opposite direction, in at the funnel G, through the inclined cylinder E', where it is heated and agitated in contact with air; thence, by the pipe H, into the inclined cylinder E, where it is heated in contact with the flame; thence into the reducing-chamber.

The office of the cylinder E', into which the pulverized ore is first fed, is to desulphurize and assist in oxidizing; and such fluxes or agents should be mixed with the ore through the funnel G in this chamber as are consistent with this purpose. What the agents and fluxes should be, will depend upon the nature of the ore under treatment.

The office of the cylinder E, into which the ore in the second place passes, is to further roast it and mix the fluxes; and into this cylinder, through the funnel G', there should be fed such fluxes and agents as are necessary and consistent with this purpose, to be governed entirely by the nature of the ore.

The office of the reducing-hearth is to liquify the ore and float the slag; and into this compartment, through the funnel G'', there should be fed such reducing agents or ore, consistent with the purpose, to be suggested by the chemical requirements of the peculiar ore under treatment and the nature of the agents previously applied.

The reducing-chamber B, as before noticed, is divided into three hearths, D D' D'', connected so that the metal flows from one to the other by way of the ducts or passages $d$, through the bridge or division walls $b$. The tops of these division-walls are all brought up to the same level, but the hearths are progressively lower one than another, the last hearth, D, being the lowest of all. The ore from the cylinder E falls into the highest of the hearths, D'', where it is melted and brought to a liquid state. The heavier parts of the metal and ore, falling to the bottom, pass into the next lower hearth through the duct $d$. In this next chamber, D', the slag flows off from the top through an opening, (not shown in the drawing,) and the metal flows on into the lowest hearth, D. In this hearth D the metal arrives in a comparatively pure condition—that is to say, it has been freed of all slag, &c. A constant supply of lead is kept in this lower hearth in a liquid state, and an overflow-pot, M, is connected thereto, so that by regulating the height at which the metal stands in said pot, the height of metal within the hearth D, and consequently in all of the hearths, may be regulated.

The lead may be backed up from the hearth D into the other hearths, if desired, or if the ore requires it. By keeping the overflow-pot properly regulated, the flow from one hearth to the other may be governed, as will be readily understood.

By thus applying the fluxes at various times I avoid chemical action of the one upon the other, &c.

It will be seen that in this process the ore passes under a gradually-increasing heat through desulphurization, calcining, roasting, and reducing, the waste heat from the one operation being utilized for the next, and no handling of the ore being necessary, as the incline of the cylinders passes the ore by gravity from one to the other and to the reducing-chamber.

Although I have thus described an apparatus capable of accomplishing my invention, I do not limit myself to that particular mechanism.

It will thus be seen, by combining the different operations in one continuous process, I am enabled to work any class of ores. For instance, in the working of argentiferous galena, the oxidation may be carried to the point where the oxide and sulphate of lead produced are exactly sufficient to react upon the unchanged sulphide of lead and precipitate all the lead. Again, in the working pyritous ores of copper or iron, in which gold and silver are found, the sulphur being removed in the first chamber in contact with air, the metal becomes oxidized, and, by adding silica as a flux as it passes to the second chamber, the ores and fluxes will be thoroughly mixed, and by the time it arrives at the reducing-chamber will be reduced, the iron and silex combining, forming silicate of iron, from which the gold, silver, copper, and any sulphur remaining will separate and precipitate themselves into a mat, leaving the slag on the surface to be floated off, and by bringing the precipitated metals or mat while in the liquid in contact with lead in the liquid state the gold and silver will unite with the lead, leaving the base metals to be floated off.

It will thus be seen if the ores contain lead or do not, they will be separated on its passage through the different chambers.

I claim as my invention—

1. The method of treating ores, substantially as specified, by passing the pulverized ore continuously, while still hot, from a desulphurizing and oxidizing chamber, heated from without, into a deoxidizing-chamber, heated from within, and from thence into an apartment of a reducing-hearth, in which the lighter or more liquid portion is retained on top to act as a reducing agent or flux upon the incoming ore, and from whence the heavier portion, including the slag, is drawn off from below into another apartment of the reducing-hearth, where the slag, rising to the surface, is removed, and from whence the heavier portion is withdrawn from below into another apartment of the reducing-hearth, and treated with lead, all without allowing the ore or products to cool.

2. The method of applying fluxes and reducing agents by feeding them in while the ore is passing from a desulphurizing and oxidizing chamber, heated from without, into a deoxidizing chamber, heated within, substantially as specified.

JAMES H. BOYD.

Witnesses:
JOHN W. MUNDAY,
HEINR. F. BRUNS.